US010371994B2

(12) United States Patent
Soh et al.

(10) Patent No.: US 10,371,994 B2
(45) Date of Patent: Aug. 6, 2019

(54) DISPLAY DEVICE INCLUDING COVER WITH APERTURE IN SIDE WALL THEREOF

(71) Applicant: Samsung Display Co. Ltd., Yongin-si, Gyeonggi-do (KR)

(72) Inventors: Yong Kwon Soh, Seongnam-si (KR); Hyun Jin Maeng, Seoul (KR); Yong Jun Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/728,643

(22) Filed: Oct. 10, 2017

(65) Prior Publication Data

US 2018/0173043 A1 Jun. 21, 2018

(30) Foreign Application Priority Data

Dec. 20, 2016 (KR) .................. 10-2016-0174428

(51) Int. Cl.
*H05K 5/00* (2006.01)
*G02F 1/1345* (2006.01)
*G02F 1/1333* (2006.01)

(52) U.S. Cl.
CPC .... *G02F 1/13452* (2013.01); *G02F 1/133308* (2013.01); *H05K 5/0017* (2013.01); *G02F 2001/13332* (2013.01); *G02F 2001/133311* (2013.01); *G02F 2202/28* (2013.01)

(58) Field of Classification Search
CPC ............ G02F 1/13452; G02F 2202/28; H05K 5/0017
See application file for complete search history.

(56) References Cited

U.S. PATENT DOCUMENTS

| 5,665,938 | A | * | 9/1997 | Boshear | ................ F21V 15/013 174/50 |
| 2013/0242541 | A1 | * | 9/2013 | Kim | ......................... F21V 7/00 362/97.1 |
| 2014/0002969 | A1 | * | 1/2014 | Hwang | ................ H05K 5/0017 361/679.01 |
| 2015/0146350 | A1 | * | 5/2015 | Tsukahara | ........... B60R 11/0235 361/679.01 |
| 2015/0277185 | A1 | * | 10/2015 | Nam | .................. G02F 1/133512 349/58 |
| 2016/0044815 | A1 | * | 2/2016 | Kim | .................. G02F 1/133308 361/752 |
| 2016/0054615 | A1 | * | 2/2016 | Kim | ..................... G02B 6/0081 362/611 |

(Continued)

FOREIGN PATENT DOCUMENTS

| JP | 2012068643 A | 4/2012 |
| KR | 1020100130779 A | 12/2010 |

*Primary Examiner* — Hoa C Nguyen
*Assistant Examiner* — Keith DePew
(74) *Attorney, Agent, or Firm* — Cantor Colburn LLP

(57) ABSTRACT

A display device is provided. The display device includes a display panel and an upper container in which the display panel is disposed. The upper container includes a cover portion which covers top edges of the display panel, a side wall which extends from the cover portion to cover a side of the display panel, and apertures defined in the side wall of the upper container, the apertures exposing the display panel to outside the display device at the side wall.

17 Claims, 21 Drawing Sheets

(56) References Cited

U.S. PATENT DOCUMENTS

| | | | |
|---|---|---|---|
| 2016/0064130 A1* | 3/2016 | Eng | H01F 7/0252 |
| | | | 335/229 |
| 2016/0192523 A1 | 6/2016 | Lin et al. | |
| 2016/0278201 A1* | 9/2016 | Cheon | H01L 27/3272 |
| 2016/0291397 A1* | 10/2016 | Pyo | G02F 1/133308 |
| 2016/0316581 A1* | 10/2016 | Horii | B29C 70/54 |
| 2017/0071070 A1* | 3/2017 | Mundrake | H05K 5/03 |
| 2017/0223847 A1* | 8/2017 | Nishida | H05K 5/0069 |
| 2018/0074360 A1* | 3/2018 | Miyazaki | G02F 1/133308 |

\* cited by examiner

DISPLAY DEVICE INCLUDING COVER WITH APERTURE IN SIDE WALL THEREOF

This application claims priority to Korean Patent Application No. 10-2016-0174428, filed on Dec. 20, 2016, and all the benefits accruing therefrom under 35 U.S.C. § 119, the disclosure of which is incorporated herein by reference in its entirety.

BACKGROUND

1. Field

The present disclosure relates to a display device.

2. Description of the Related Art

A display device is a device displaying an image using light, for example, an organic light-emitting display panel or a liquid crystal display ("LCD") panel. The display device may be employed in various devices such as a television (TV), a monitor, a notebook computer, a tablet personal computer (PC), a smartphone, a mobile phone, and the like.

The display device includes a display panel displaying an image with light and an upper container covering and protecting the edges of the display panel.

SUMMARY

Exemplary embodiments of the present disclosure provide a display device capable of reducing or effectively preventing damage that may be caused by an external material infiltrated thereinto, by helping releasing of the infiltrated external material to outside the display device.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, there is provided a display device. The display device includes a display panel, and an upper container in which the display panel is disposed. The upper container includes a cover portion which covers top edges of the display panel, a side wall which extends from the cover portion to cover a side of the display panel, and apertures defined in the side wall of the upper container, the apertures exposing the display panel to outside the display device at the side wall of the upper container.

According to another exemplary embodiment of the present disclosure, there is provided a display device. The display device includes a display panel, and an upper container in which the display panel is disposed. The upper container includes a cover portion which covers top edges of the display panel, a side wall which extends from the cover portion to cover a side of the display panel, apertures defined in the side wall of the upper container, the apertures exposing the display panel to outside the display device at the side wall of the upper container, and a protruding portion at an inner side of the side wall in which the apertures are defined.

According to another exemplary embodiment of the present disclosure, there is provided a display device. The display device includes a display panel, and an upper container in which the display panel is disposed. The upper container includes a cover portion which covers top edges of the display panel, and a side wall which extends from the cover portion to cover a side of the display panel, a space formed between the display panel and the side wall of the upper container, apertures defined in the side wall of the upper container, the apertures exposing the space to outside the display device at the side wall of the upper container, a gap formed between an upper surface of the display panel and the cover portion of the upper container, the gap exposing the space to outside the display device at the cover portion, and a driving circuit unit attached to the display panel at a side thereof corresponding to the side wall in which the apertures are defined. The driving circuit unit attached to the display panel extends from the display panel to be disposed along an inner side of the side wall of the upper container, the driving circuit unit extended along the inner side of the side wall contacting the inner side of the side wall of the upper container to define a contact portion thereof. The apertures are defined in the side wall of the upper container at a location between the contact portion and the cover surface of the upper container. The space formed between the display panel and the inner side of the side wall of the upper container is divided, by the driving circuit unit, into a first region formed between the driving circuit unit, and each of the cover portion and the side wall of the upper container, and a second region formed between the driving circuit unit and the display panel. The gap and the first region are spatially connected directly to each other to expose the first region to outside the display device at the cover portion, and the first region and the apertures are spatially connected directly to each other to expose the first region to outside the display device at the side wall of the upper container.

According to one or more exemplary embodiments of the present disclosure, any external material infiltrated into an inner area of a display device can be released through apertures formed at a side wall of an upper container of the display device. Accordingly, damage that may be caused by the external material can be reduced or effectively prevented.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
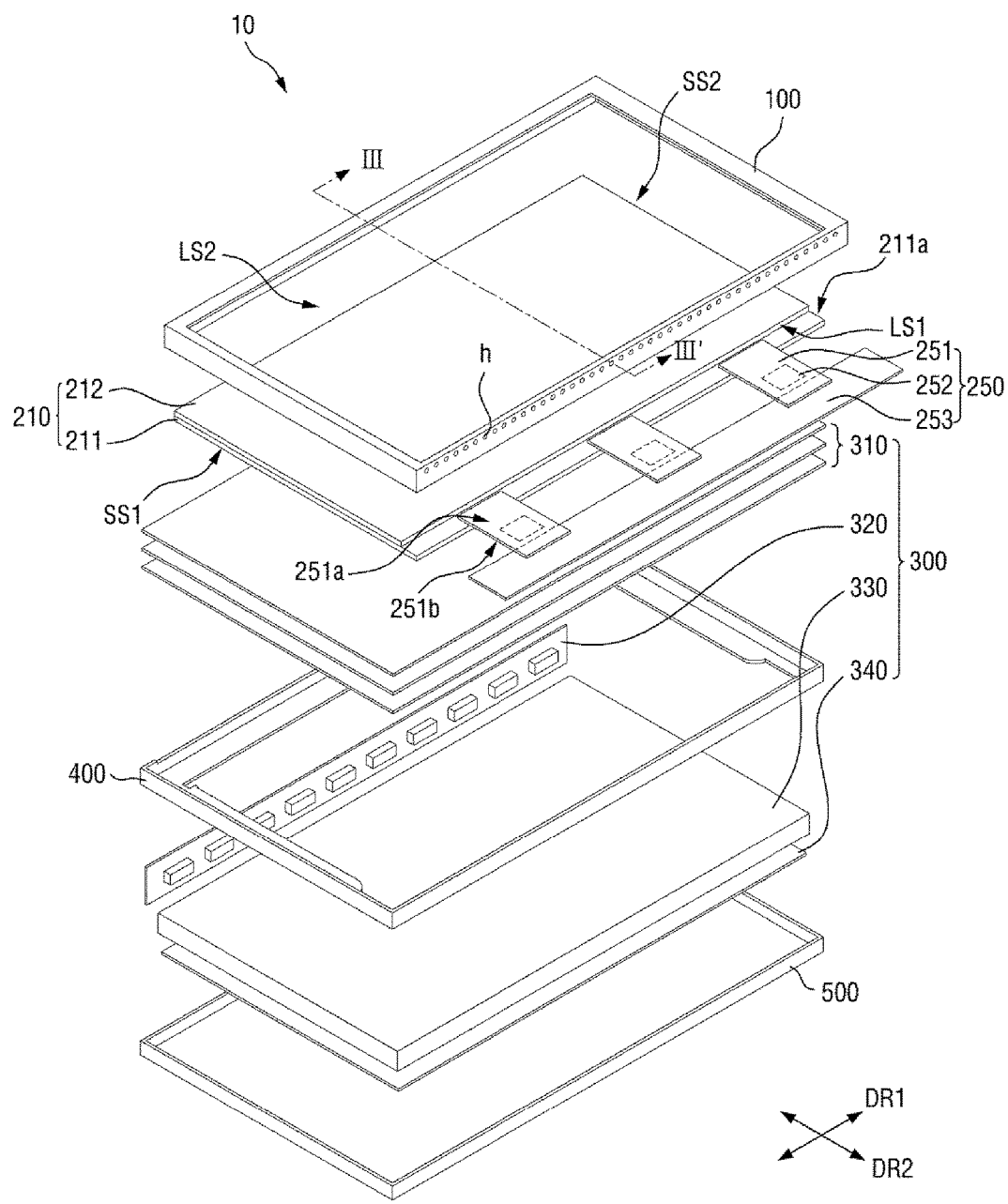
FIG. 1 is an exploded perspective view of an exemplary embodiment of a display device according to the invention, having an aperture in an upper container.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined within the scope of the appended claims. Like reference numerals refer to like elements throughout.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. The terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In a display device, an upper container covers edges of a display panel which displays an image with light, and surrounds sides of the display panel and sides a backlight unit which generates and provides the light to the display panel. A predetermined space is formed between the upper container and the display panel. An external material may be infiltrated into the display device through the space between the upper container and the display panel.

However, the external material infiltrated into the display device may pollute the internal parts or elements of the display device such as the display panel and/or a driving chip and may thus undesirably cause damage to the display device.

Exemplary embodiments of the present disclosure will hereinafter be described with reference to the accompanying drawings.

FIG. 1 is an exploded perspective view of an exemplary embodiment of a display device according to the invention, having an aperture in an upper container.

Figure 2:
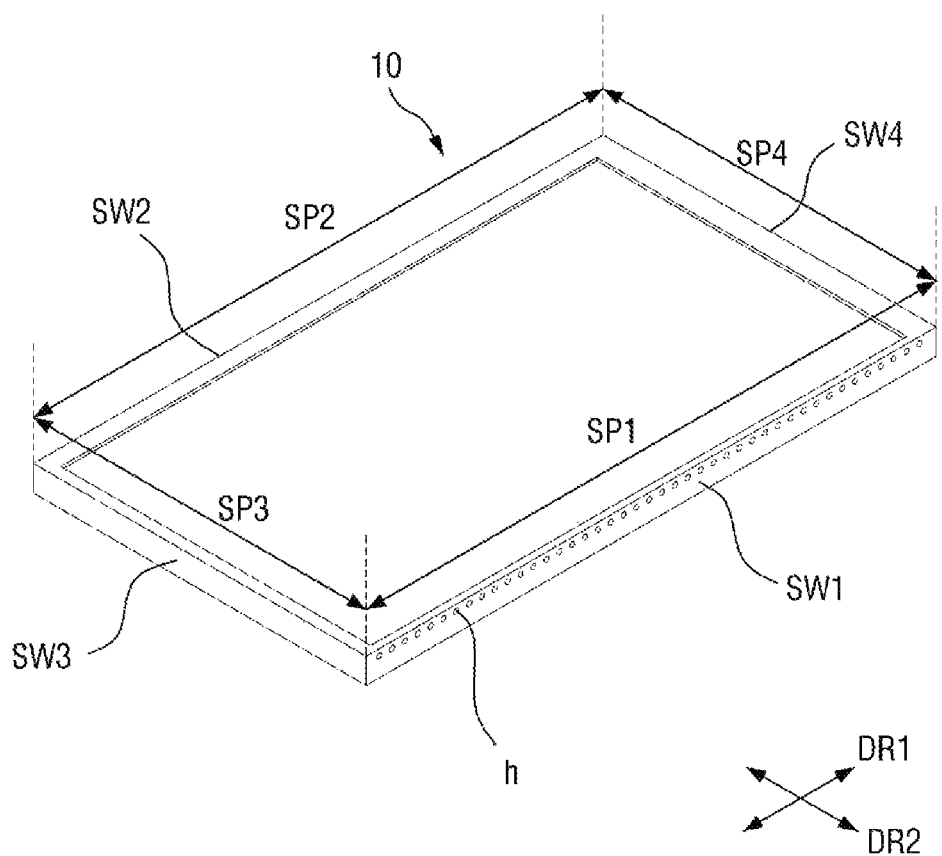
FIG. 2 is a perspective view of the display device of FIG. 1.

FIG. 2 is a perspective view of the display device of FIG. 1. FIG. 2 shows an assembled state of the display device in FIG. 1.

Figure 3:
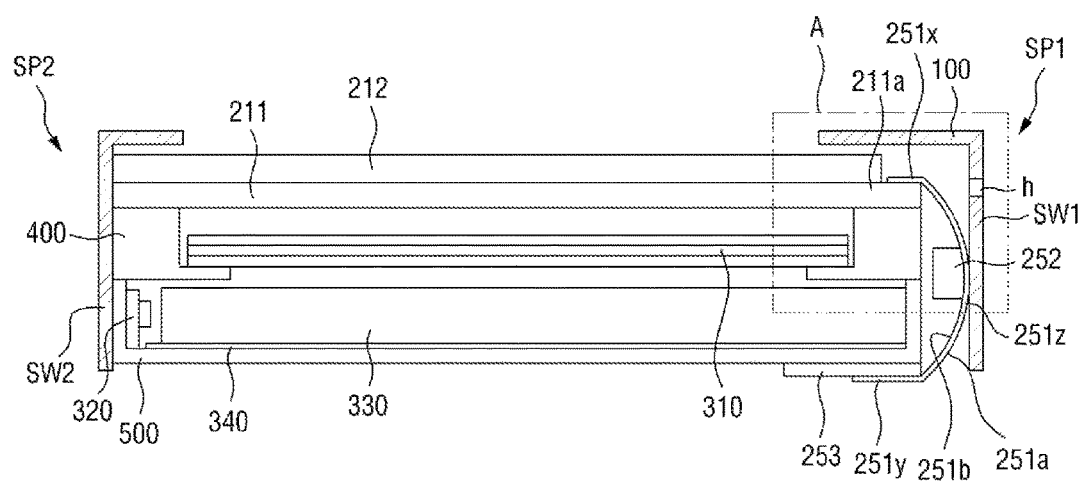
FIG. 3 is a cross-sectional view taken along line of FIG. 1.

FIG. 3 is a cross-sectional view taken along line of FIG. 1.

Referring to FIGS. 1 through 3, a display device 10 includes a display panel assembly, a backlight unit 300 disposed below the display panel assembly, and an upper container 100 covering the top edges of the display panel assembly.

The display device 10 may have various overall shapes such as a rectangular or circular shape in a top plan view. In an exemplary embodiment, for example, as illustrated in FIG. 1, the display device 10 may be rectangular in a top plan view. That is, the display device 10 may be substantially in the shape of a rectangular pillar and may have four sides. A driving circuit unit 250 may be attached to the display panel assembly at a side of the display device 10. FIG. 1 illustrates an example in which the driving circuit unit 250 is attached at one side of the display device 10. For convenience, the side of the display device 10 where the driving circuit 250 is attached will hereinafter be referred to as a first side SP1, a side opposite to the first side SP1 will hereinafter be referred to as a second side SP2, and sides left and right to the first side SP1 will hereinafter be referred to as third and fourth sides SP3 and SP4, respectively.

The display panel assembly includes a display panel 210, which includes first and second (display) substrates 211 and 212, and the driving circuit unit 250. The sides of the display device 10 described above may be used to similarly describe sides of the display panel 210 or other components of the display device 10. The driving circuit unit 250 is attached at the first side SP1 of the display panel 210. The driving circuit unit 250 includes a flexible circuit board 251 provided in plurality, a driving chip "D-IC" 252 provided in plurality, which are respectively mounted on the flexible circuit boards 251, and a printed circuit board 253, which is attached to the flexible circuit boards 251. A single one of the printed circuit board 253 may be commonly attached to each of the flexible circuit boards 251.

The display panel 210, which is a panel generating and displaying an image with light, may be, for example, a liquid crystal display ("LCD") panel or an organic light-emitting display panel. In the exemplary embodiment of FIG. 1, an LCD panel may be used as the display panel 210. The display panel 210 may include the first and second substrates 211 and 212, and an optical transmittance layer such as a liquid crystal layer (not illustrated) interposed between the first and second substrates 211 and 212.

The display panel 210 may have relatively long sides lengthwise extending in a first direction DR1 and relatively short sides lengthwise extending in a second direction DR2, which intersects the first direction DR1. The display device 10 and the components thereof may be disposed in a plane defined by the first and second directions DR1 and DR2. Specifically, the display panel 210 may include first and second long sides LS1 and LS2 that are opposite to each other and lengthwise extend in the first direction DR1, and first and second short sides SS1 and SS2 that are opposite to each other and lengthwise extend in the second direction DR2. The first long side LS1 may be disposed along the first side SP1, and the first short side SS1 may be disposed along the third side SP3.

The first and second substrates 211 and 212 may generally overlap with each other in a vertical direction. The vertical direction may be a third direction which intersects both of the first and second directions DR1 and DR2, and indicates a thickness direction of the display device 10 and components thereof. The second substrate 212 may completely overlap with the first substrate 211, but the first substrate 211 may protrude beyond the second substrate 212 and may include a portion not overlapping with (e.g., exposed from) the second substrate 212. As illustrated in FIG. 1, for example, the first long side LS1 of the first substrate 211 may protrude from the first long side LS1 of the second substrate 212 in the second direction DR2. As a result, the first long side LS1 of the first substrate 211 may be located in the non-overlapping region between the first and second substrates 211 and 212.

The driving circuit unit 250 may include the flexible circuit boards 251, the driving chips 252 and the printed circuit board 253.

One flexible circuit board 251 or a plurality of flexible circuit board 251 may be provided. In a case where there are provided multiple flexible circuit boards 251, the flexible circuit boards 251 may be arranged along the first direction DR1.

First ends of the flexible circuit boards 251 may overlap with a protruding region 211a of the first substrate 211, and second ends of the flexible circuit boards 251 may overlap with the printed circuit board 253. Each of the flexible circuit boards 251 may be divided into a first section 251x overlapping with the first substrate 211, a second section 251y overlapping with the printed circuit board 253, and a third section 251z provided between the first and second sections 251x and 251y.

Each of the flexible circuit boards 251 has a first surface 251a and a second surface 251b which is opposite to the first surface 251a. The second surfaces 251b of the flexible circuit boards 251 at the first sections 251x thereof are attached to the protruding region 211a of the first substrate 211, and the second surfaces 251b of the flexible circuit boards 251 at the second sections 251y thereof are attached to the printed circuit board 253.

The driving chips 252 are mounted on the third sections 251z of the flexible circuit boards 251 at the second surfaces 251b thereof. The driving chips 252 provide the display panel 210 with a control signal and an image signal for driving the display panel 210, through the flexible circuit boards 251.

The printed circuit board 253 generates various signals necessary for the operation of the display panel 210, such as the control signal and the image signal, but not being limited thereto.

The printed circuit board 253 may have relatively long sides lengthwise extending in the first direction DR1 and relatively short sides lengthwise extending in the second direction DR2. One of the long sides of the printed circuit board 253 may be placed in contact with respective edge portions of the flexible circuit boards 251 at the second surfaces 251b thereof. In a case where there are provided multiple flexible circuit boards 251, the second surfaces 251b at the edge portions of the flexible circuit boards 251 may be connected to the printed circuit board 253.

At the first side SP1 of the display device 10, the driving circuit unit 250 widthwise extends from the second substrate 212 toward the first long side LS1 of the first substrate 211 and is then bent downwardly so that a portion of the driving circuit unit 250 can be received in the backlight unit 300. This will be described later in detail.

The backlight unit 300 is disposed below the display panel 210. The backlight unit 300 generates light and provides the light to the display panel 210.

The backlight unit 300 includes a light source unit 320 which generates and emits light, a light guide plate 330, which guides the direction of the light emitted from the light source unit 320, a reflection sheet 340, and optical sheets 310, which control the optical properties of light transmitted through the light guide plate 330.

The light guide plate 330 is disposed below the display panel 210. The light guide plate 330 is disposed to face the display panel 210 and be disposed in parallel thereto.

The light source unit 320 is disposed at one side of the light guide plate 330 to face a light-entering surface of the light guide plate 330. The light source unit 320 is illustrated as being disposed along the second side SP2 of the light guide plate 330, but the present disclosure is not limited thereto. That is, alternatively, the light source unit 320 may be disposed below the light guide plate 330 instead of at a side thereof. FIGS. 1 and 2 illustrate an example in which the light source unit 320 is lengthwise extended to be aligned along the second side SP2.

The light source unit 320 may include a light-emitting diode ("LED") provided in plurality as light sources, which are a predetermined distance apart from one another, but the present disclosure is not limited thereto. The light source unit 320 may include various other light sources, including linear light sources such as cold cathode fluorescent lamps ("CCFLs"), hot cathode fluorescent lamps ("HCFLs") or external electrode fluorescent lamps ("EEFLs"), and surface light sources such as flat fluorescent lamps ("FFLs").

The reflection sheet 340 is disposed below the light guide plate 330. Light transmitted through the light guide plate 330 and reflected downwardly is reflected back toward the display panel 210 by the reflection sheet 340.

The optical sheets 310 are disposed above the light guide plate 330 to face a light-exiting surface thereof. Side surfaces of the light guide plate 330 connect the light-entering surface and the light-exiting surface thereof. The optical sheets 310 may include a collection of individual sheets such as a diffusion sheet and at least one light collecting sheet. Light transmitted through and exiting from the light guide plate 330 is incident upon the optical sheets 310. The optical sheets 310 diffuse or collect light incident thereupon so that surface light can be uniformly incident upon the display panel 210.

The backlight unit 300 further includes a mold frame 400 receiving or accommodating the optical sheets 310 therein, and a lower container 500 receiving or accommodating the light source unit 320, the light guide plate 330 and the reflection sheet 340 therein.

The lower container 500 has a bottom (portion) and side walls which extend from edges of the bottom portion. Specifically, the lower container 500 has a bottom facing the display panel 210 to be disposed in parallel therewith, and side walls extending from the edges of the bottom toward the display panel 210. The bottom and the sidewalls of the lower container 500 may form a right angle with each other. The reflection sheet 340 and the light guide plate 330 are mounted in the lower container 500. The light source unit 320 is mounted along the second side SP2 of the lower container 500, such as at an inner surface of a side wall thereof.

The mold frame 400 is disposed on the lower container 500. The mold frame 400 supports the optical sheets 310 and the display panel 210 thereon.

The mold frame 400 is substantially rectangular and has a bottom, which includes an aperture formed therein or thereby, and side walls, which extend from edges of the bottom toward the display panel 210 such as to form a right angle with the bottom.

The upper container 100 covers the edges of the display panel 210 and surrounds the sides of the display panel 210 and the sides the backlight unit 300. The upper container 100 has a cover (portion) surface, which includes an aperture defined therein or thereby, and side walls, which extend from edges of the cover surface toward the lower container 500 such as to form a right angle with the cover surface. The side walls of the upper container 100 include first, second, third and fourth side walls SW1, SW2, SW3 and SW4 disposed lengthwise extended (double-headed arrows in FIG. 2) along the first, second, third and fourth sides SP1, SP2, SP3, and SP4, respectively. The cover portion and the first, second, third and fourth side walls SW1, SW2, SW3, and SW4 of the upper container 100 may form an outer surface of the overall display device 10, as illustrated in FIG. 2. Outer surfaces of the cover portion and the first, second, third and fourth side walls SW1, SW2, SW3, and SW4 are exposed to outside the display device 10.

The first, second, third and fourth side walls SW1, SW2, SW3, and SW4 of the upper container 100 include an aperture h provided in plurality respectively penetrating the first, second, third and fourth side walls SW1, SW2, SW3 and SW4 in a thickness direction of the upper container 100. The thickness direction of the upper container 100 is defined perpendicular to a plane in which the cover portion or a side wall is respectively disposed.

In an exemplary embodiment, for example, a plurality of apertures h may be provided on or in the first side wall SW1 of the upper container 100 near the first side SP1 of the display panel 210 where the driving circuit unit 250 is attached, but the present disclosure is not limited thereto. That is, the apertures h may also be provided on or in the other side walls of the upper container 100. The arrangement and the locations of the apertures h will hereinafter be described with reference to FIG. 4.

Figure 4:
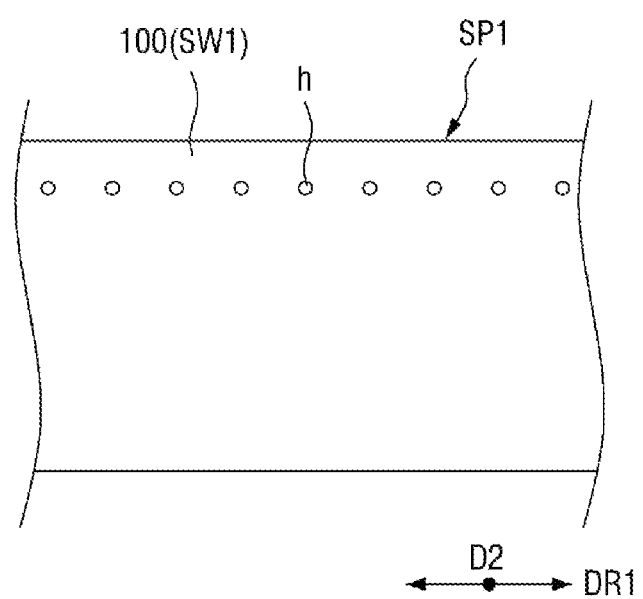
FIG. 4 is an enlarged side view of the display device of FIG. 1, as viewed from a direction corresponding to a first side of the display device of FIG. 1.

FIG. 4 is an enlarged side view of the display device of FIG. 1, as viewed from a direction corresponding to the first side of the display device of FIG. 1.

Referring to FIG. 4, the apertures h may be aligned in the first direction DR1 along a length of the first side wall SW1 of the upper container 100.

The apertures h may be disposed in series at regular intervals along the first side wall SW1, but are not limited thereto. The apertures h may be disposed in series at regular intervals at more than one side wall or all the side walls of the upper container 100.

The apertures h may be disposed or formed in or by the side walls of the upper container 100 in a planar dot (discrete) shape. The apertures h may have a circular shape, but the present disclosure is not limited thereto. That is, alternatively, the apertures h may have an oval, diamond or rectangular planar shape.

It will hereinafter be described how the display panel 210, the backlight unit 300 and the upper container 100 are coupled to one another.

Figure 5:
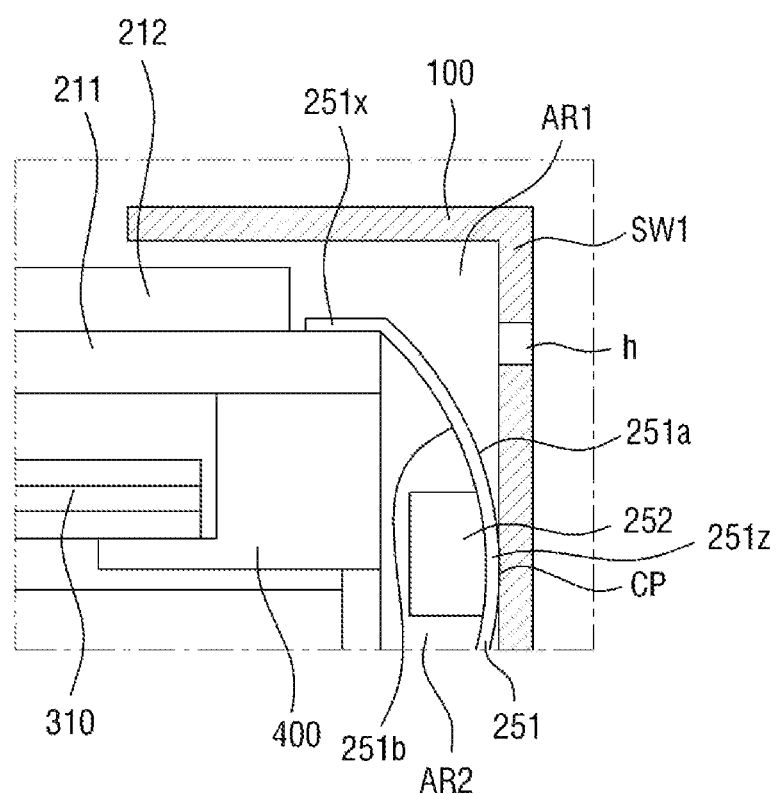
FIG. 5 is an enlarged cross-sectional view of an area A of FIG. 3, particularly, a cross-sectional view of the first side of the display device of FIG. 1.

FIG. 5 is an enlarged cross-sectional view of an area A of FIG. 3, particularly, a cross-sectional view of the first side of the display device of FIG. 1.

Referring to FIGS. 1 through 5, the mold frame 400 is disposed on top of the side walls of the lower container 500, and the display panel 210 may be disposed on top of the side walls of the mold frame 400. The side walls of the upper container 100 are disposed on the outside of the lower container 500 and the mold frame 400. The cover surface of the upper container 100 partially covers the edges of the second substrate 212 of the display panel 210 and is a predetermined distance apart from the upper surface of the second substrate 212, rather than being placed in contact with the upper surface of the second substrate 212. The predetermined distance at which the cover surface of the upper container 100 is spaced from of the display panel 210 forms a gap or space, such as at the viewing side of the display device 10. This gap is connected to an inner area of the display device 10 and exposes the inner area thereof to outside the display device 10.

A second side wall SW2 of the upper container 100 corresponding to the second side SP2 is placed in contact with the outer sides (surfaces) of the mold frame 400 and the lower container 500. Although not specifically illustrated, third and fourth side walls SW3 and SW4 of the upper container 100 corresponding to the third and fourth sides SP3 and SP4, respectively, are placed in contact with the outer sides (surfaces) of the mold frame 400 and the lower container 500.

A first side wall SW1 of the upper container 100 corresponding to the first side SP1 is not placed in contact with the outer sides (surfaces) of the mold frame 400 and the lower container 500. Instead, the first sidewall SW1 of the upper container is disposed a predetermined distance apart from the outer sides of the mold frame 400 and the lower container 500, to define a space between the first side wall SW1 of the upper container 100, and the outer sides of the mold frame 400 and the display panel 210, and the lower container 500, respectively. The driving circuit unit 250 is disposed in the space between the first side wall SW1 of the upper container 100, and the outer sides of the mold frame 400 and the display panel 210, and the lower container 500.

The flexible circuit boards 251, which are attached on the top surface of the protruding region 211a of the first substrate 211, are bent toward the lower container 500. That is, first sections 251x of the flexible circuit boards 251 are attached at the second surfaces 251b thereof on the top surface of the protruding region 211a of the first substrate, and the third sections 251z of the flexible circuit boards 251 extend to dispose the second surfaces 251b thereof facing the mold frame 400, the flexible circuit boards 251 to pass to the outer side of the lower container 500. At the outer side of the lower container 500, the second sections 251y of the flexible circuit boards 251 dispose the second surfaces 251b thereof facing the bottom surface of the bottom of the lower container 500. The printed circuit board 253 with the second surfaces 251b of the second sections 251y of the flexible circuit boards 251 attached thereon is disposed between the bottom of the lower container 500 and the flexible circuit boards 251.

The first surfaces 251a of the first sections 251x of the flexible circuit boards 251 face the cover surface of the upper container 100, and the first surfaces 251a of the third sections 251z of the flexible circuit boards 251 face the inner side of the first side wall SW1 of the upper container 100. The flexible circuit boards 251 are generally bent outwardly along the width thereof from the first sections 251x to the second sections 251 to protrude outwardly, and the outwardly-protruding parts of the flexible circuit boards 251 may be placed in contact with the first side wall SW1 of the upper container 100. That is, a portion of the first surfaces 251a of the third sections 251z of the flexible circuit boards 251 may be placed in contact with the inner side of the first side wall SW1 of the upper container 100, and this portion will hereinafter be referred to as a contact portion CP. The contact portion CP may be defined by a component of the driving circuit unit 250 which is disposed furthest outwardly and away from the display panel 210 and/or mold frame 400. The driving chips 252, which are mounted on the first surfaces 251a of the flexible circuit boards 251, may be located at the contact portions CP, but the present disclosure is not limited thereto.

The space between the first side wall SW1 of the upper container 100, and the mold frame 400 and the display panel 210, may be divided into two regions by the flexible circuit boards 251. That is, the space between the first side wall SW1 of the upper container 100, and the mold frame 400 and the display panel 210, includes a first region AR1 between the first side wall SW1 of the upper container 100 and the first surface 251a of the flexible circuit boards 251 and a second region AR2 between the second surface 251b of the flexible circuit boards 251, and each of the mold frame 400 and the display panel 210. The second region AR2 may be considered as enclosed by the second surface 251b of the flexible circuit boards 251, and the mold frame 400 and the display panel 210. The first region AR1 is spatially connected directly to the gap between the cover surface of the upper container 100 and the display panel 210. That is, a flow path may be formed from outside the display device 10, through the gap, to the apertures h and back outside the display device 10. On the other hand, the second region AR2 is blocked by the flexible circuit boards 251 and thus may not be spatially connected directly to the gap between the cover surface of the upper container 100 and the display panel 210.

The apertures h, which are disposed or formed in or by the first side wall SW1 of the upper container 100, are located between the cover surface of the upper container 100 and the contact portions CP. In a thickness direction of the display device 10, the apertures h may be disposed or formed in or by the first side wall SW1 of the upper container 100 to be closer to the cover surface of the upper container 100 than to the contact portions CP.

The apertures h connect the inside and the outside of the display device 10, which are physically separated by the first side wall SW1 of the upper container 100. That is, the apertures h connect the inside at the first region AR1 to the outside of the display device 10.

Accordingly, the gap between the display panel 210 and the cover surface of the upper container 100, the first region AR1 at the inside of the display device 10, and the outside of the display device 10 may all be connected to one another.

If an external material such as, for example, water, is infiltrated into the gap between the display panel 210 and the cover surface of the upper container 100, the infiltrated external material may pass through the first region AR1 and may then be released to the outside of the display device 10 through the apertures h. Since the first and second regions AR1 and AR2 are physically separated by the flexible circuit boards 251, the infiltrated external material may be released through the apertures h before entering the second region AR2. Also, since the driving chips 252 are located in the second region AR2, the driving chips 252 can be blocked from the infiltrated external material. Since the infiltrated external material is released to the outside of the display device 10 through the apertures h before arriving at the driving chips 252, the possibility of the driving chips 252 being polluted by the infiltrated external material may be reduced.

In an exemplary embodiment, for example, in a case where the first side SP1 of the display device 10 faces downwardly (e.g., gravity direction) and the second side SP2 of the display device 10 faces upwardly (e.g., opposite to gravity direction), water infiltrated into the gap between the upper container 100 and the display panel 210 may move along the inner side of the first side wall SW1 of the upper container 100 or the first surfaces 251a of the flexible circuit boards 251 and may then be released to the outside of the display device 10 through the apertures h. Accordingly, damage to the driving chips 252 from the water can be reduced or effectively prevented.

Display devices according to other exemplary embodiments of the present disclosure will hereinafter be described.

Figure 6:
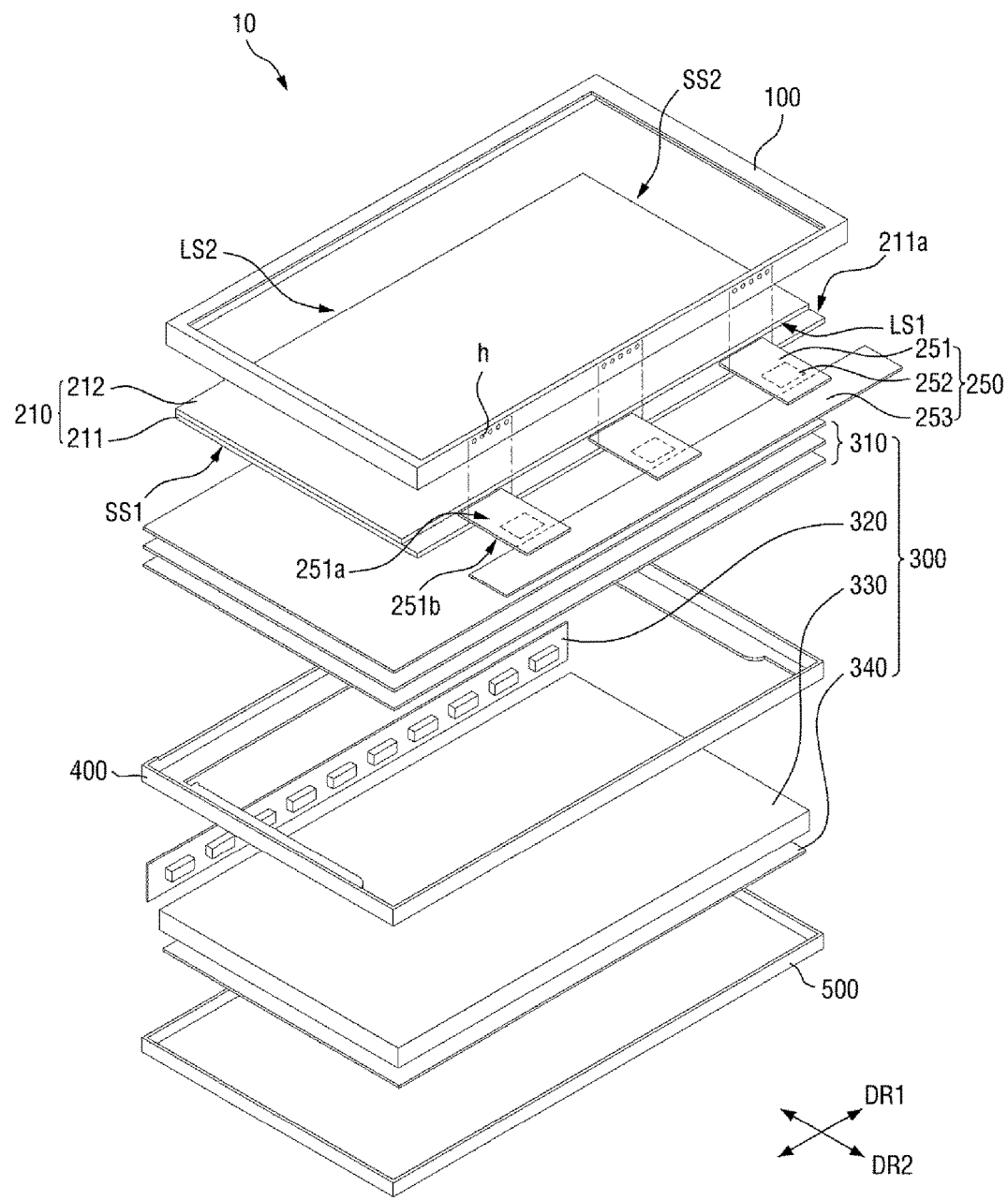
FIG. 6 is an exploded perspective view of a modified exemplary embodiment of a display device according to the invention, having an array of apertures in an upper container.

FIG. 6 is an exploded perspective view of a modified exemplary embodiment of a display device according to the invention, having an array of apertures in an upper container.

FIG. 6 shows that a plurality of apertures h can be grouped or arranged to correspond with each flexible circuit board 251. Referring to FIG. 6, an array of apertures h may be disposed or formed within a range corresponding to a length of each flexible circuit board 251 in a first direction DR1. The expression "the array of apertures h is formed within the range corresponding to the length of each flexible circuit board 251 in the first direction DR1," as used herein, means that a total length occupied by the array of apertures h is the same or similar to, a length of each respective flexible circuit board 251.

Since the apertures h are disposed formed only in a region corresponding with each flexible circuit board 251, an external material can be released to the outside of a display device 10 through a first region AR1 and the apertures h, and at the same time, the durability of an upper container 100 can be improved because the apertures h are disposed or formed only in particular regions on the upper container 100.

The arrangement of, and the interval between, the apertures h have been described above with reference to FIGS. 1 through 6, but the present disclosure is not limited to the exemplary embodiments of FIGS. 1 through 6. That is, the apertures h may be arranged in various other manners at various other intervals.

Figure 7:
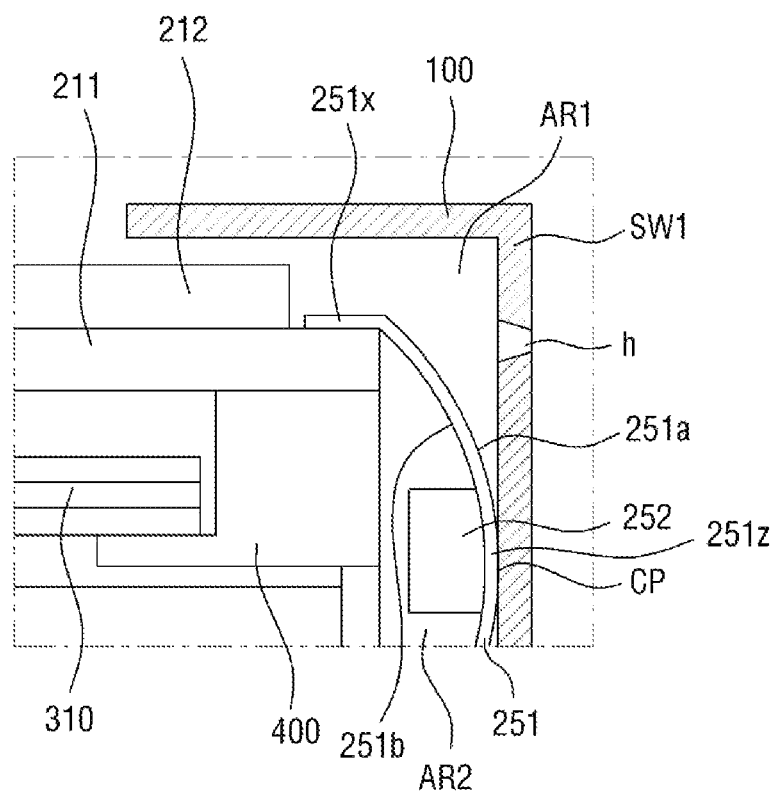
FIG. 7 is an enlarged cross-sectional view of a modified exemplary embodiment of a display device according to the invention, for showing a shape of an aperture in an upper container.

FIG. 7 is an enlarged cross-sectional view of a modified exemplary embodiment of a display device according to the invention, for showing a shape of an aperture in an upper container.

Figure 8:
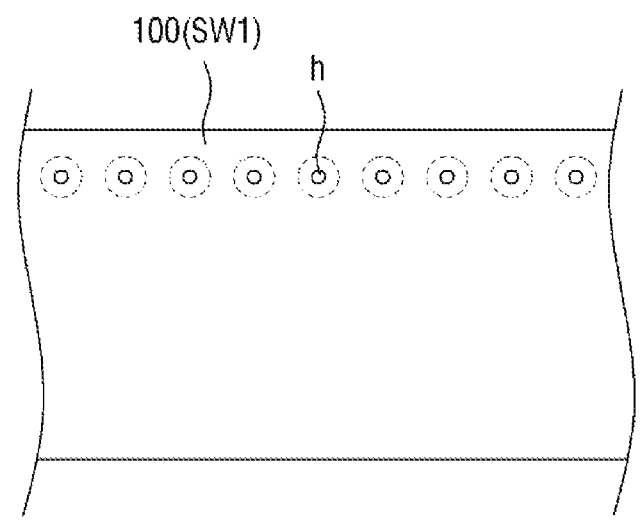
FIG. 8 is an enlarged side view of the display device of FIG. 7.

FIG. 8 is an enlarged side view of the display device of FIG. 7.

Referring to FIG. 7, a dimension such as the diameter of apertures h, unlike the diameter of the apertures h of FIGS. 4 and 5, may vary along a thickness direction of an upper container 100. Since the first sidewall SW1 is disposed in a plane defined by the third direction (vertical in FIG. 7) and the first direction DR1 (refer to FIGS. 3 and 5), a thickness direction of the first sidewall is defined in the second direction DR2 (horizontal in FIG. 7). Specifically, the apertures h may have a relatively large diameter on the inner side of a first side wall SW1 of the upper container 100 and may have a relatively small diameter on the outside of the first side wall SW1 of the upper container 100.

Referring to FIG. 8, the apertures h may have a smaller diameter on the outer side of the upper container 100 than on the inner side of the first side wall SW1 of the upper container 100.

In a case where the apertures h have a smaller cross-sectional area on the outer side than on the inner side of the upper container 100, an external material infiltrated into the first region AR1 of a display device 10 can be easily released to the outside of the display device 10, but cannot be easily infiltrated back into the display device 10 from outside thereof.

Figure 9:
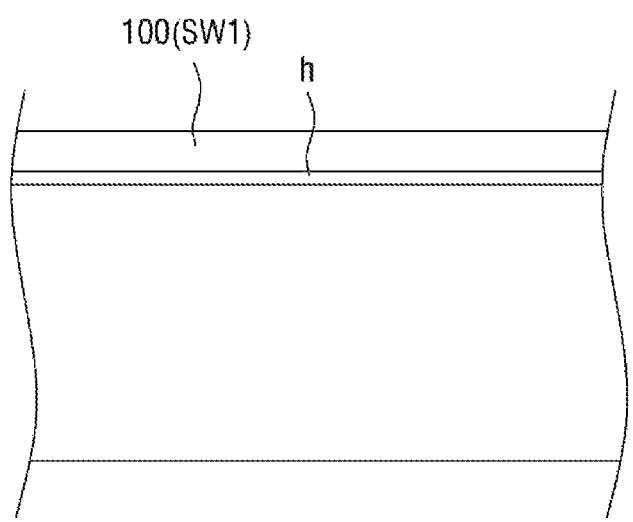
FIG. 9 is an enlarged side view of a modified exemplary embodiment of a display device according to the invention, for showing a modified shape of an aperture in an upper container.

FIG. 9 is an enlarged side view of a modified exemplary embodiment of a display device according to the invention, for showing a modified shape of an aperture in an upper container.

Referring to FIG. 9, an aperture h may be formed in a linear shape, in a plan view, extending in one direction. The aperture h may be a single discrete member. That is, the aperture h may be disposed or formed in a rectangular shape extending in a first direction DR1 along a first side wall SW1 of an upper container 100. The aperture h may have a uniform cross-sectional shape along a direction in which the aperture h extends, but the present disclosure is not limited thereto. The aperture h, which is rectangular in a plan view, is easy to be fabricated. Also, in a case where the aperture h is formed to have a uniform area throughout the upper container 100, the aperture h may have a relatively large cross-sectional area and can thus easily release an external material therethrough, as compared to an aperture having a discontinuous shape.

The shape of the aperture h on the side wall SW1 of an upper container 100, however, is not particularly limited, and various modifications can be made thereto without departing from the scope of the present disclosure.

Figure 10:
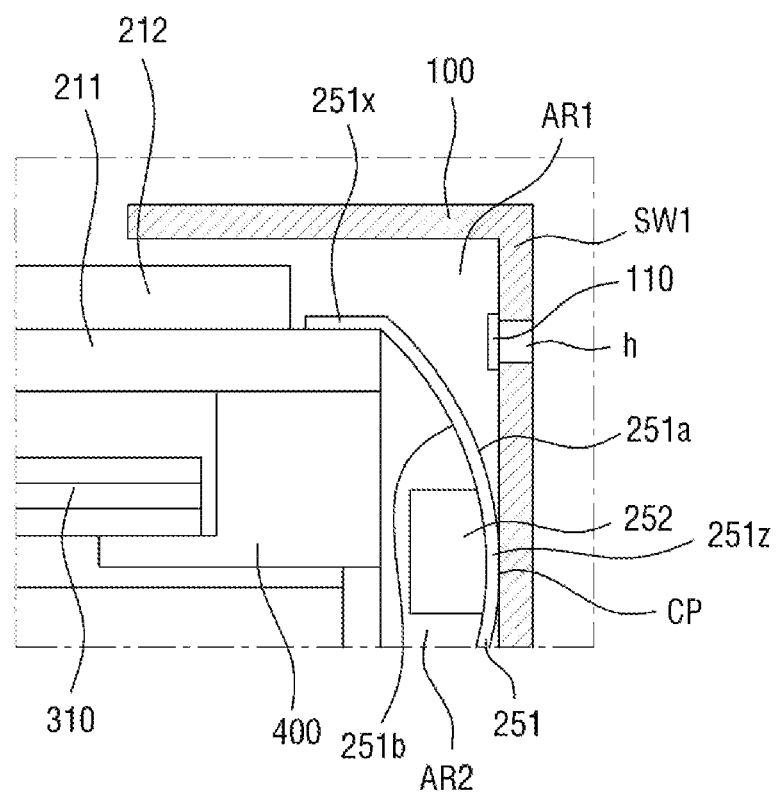
FIG. 10 is an enlarged cross-sectional view of another modified exemplary embodiment of a display device according to the invention, having a membrane member on an aperture in an upper container.

FIG. 10 is an enlarged cross-sectional view of another modified exemplary embodiment of a display device according to the invention, having a membrane member on an aperture in an upper container.

Figure 11:
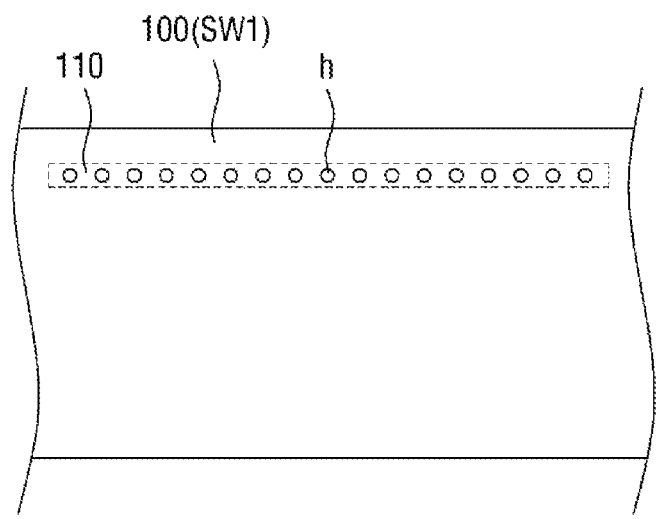
FIG. 11 is an enlarged side view of the display device of FIG. 10.

FIG. 11 is an enlarged side view of the display device of FIG. 10.

Referring to FIGS. 10 and 11, an upper container 100 may further include a membrane member 110 covering a group or array of apertures h.

The membrane member 110 may be a single member extending in one direction along a first side wall SW1 of an upper container 100. The membrane member 110 may be commonly disposed to each of the group or array of apertures h, such as all of the apertures at a side wall of the upper container 100, but is not limited thereto.

The membrane member 110 is attached on the upper container 110 along a first side wall SW1 of the upper container 100 where the apertures h are formed. The membrane member 110 is attached to cover the group or array apertures h. That is, the membrane member 110 includes an overlapping region overlapping with, and covering, the apertures h and a non-overlapping region placed in contact with the first side wall SW1 of the upper container 100 while not overlapping with the apertures h.

The membrane member 110 may be adhesive and may thus be able to be attached on the first side wall SW1 of the upper container 100 without the aid of an additional adhesive member.

The membrane member 110 may be capable of allowing liquids and gases to pass therethrough while blocking a flow of solids therethrough such as dust. That is, the membrane member 110 may be a porous membrane or fabric, but the present disclosure is not limited thereto.

The membrane member 110 blocks the infiltration of an external material through the apertures h from outside the display device 10. Also, the membrane member 110 allows an external material infiltrated into the space between a display panel 210 and the upper container 100 to be released through the apertures h. In an exemplary embodiment, for example, an external material such as water infiltrated into the space between the display panel 210 and the upper container 100 can pass through a first region AR1 and the membrane member 110 and can then be released through the apertures h. On the other hand, an external material such as dust cannot be infiltrated into the first region AR1 through the apertures h from outside the display device 10.

In the exemplary embodiment of FIGS. 10 and 11, the membrane member 110 is disposed on the inner side of the first side wall SW1 of the upper container 100, but the present disclosure is not limited thereto. That is, alternatively, the membrane member 110 is disposed on the outer side of the first side wall SW1 of the upper container 100.

Figure 12:
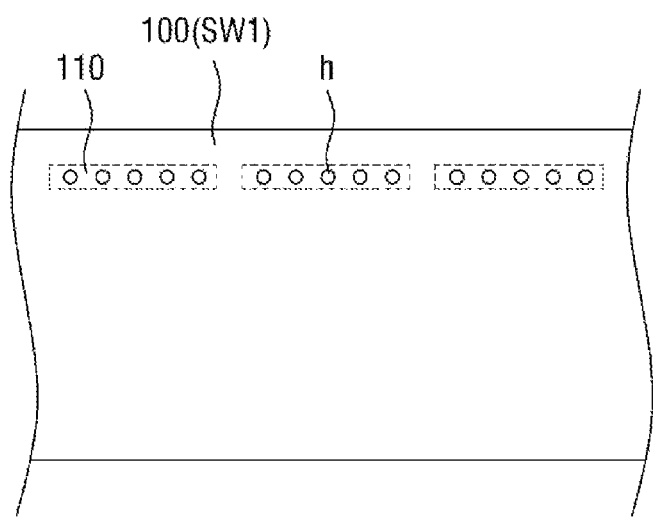
FIG. 12 is an enlarged side view of a modified exemplary embodiment of a display device according to the invention, for explaining the shape and arrangement of membrane members.

FIG. 12 is an enlarged side view of a modified exemplary embodiment of a display device according to the invention for explaining the shape and arrangement of membrane members.

Referring to FIG. 12, the membrane member 110 may be provided in plurality such as a plurality of rectangle-shaped members, rather than as a single rectangle-shaped member, arranged in one direction along a first side wall SW1 of an upper container 100, and may be spaced apart at a predetermined distance apart from one another. Each membrane member 110 may correspond to a single group or array of the apertures h.

The shape and arrangement of the membrane members 110, however, are not particularly limited, and various modifications can be made thereto without departing from the scope of the present disclosure.

Figure 13:
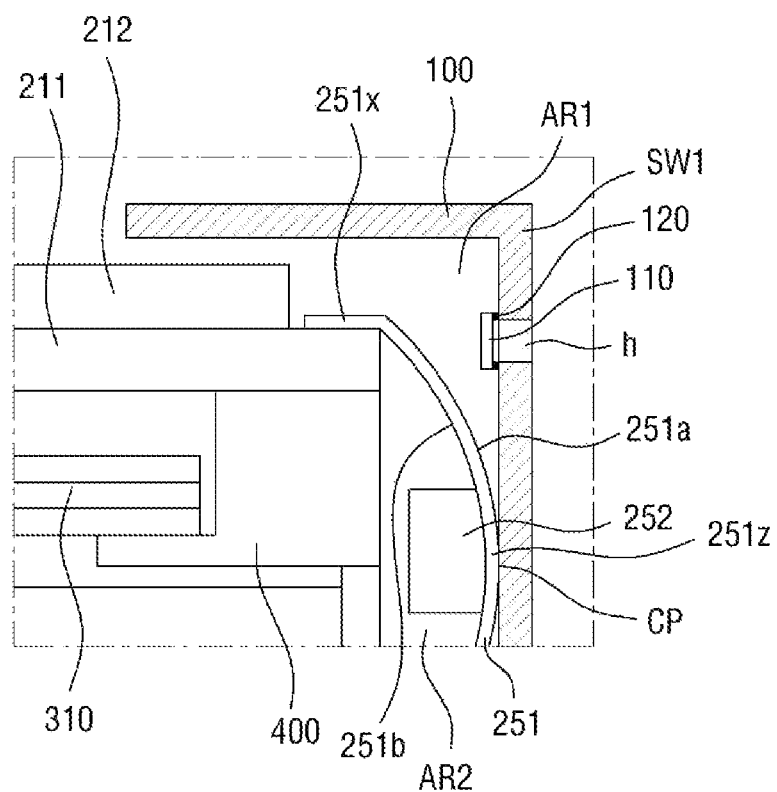
FIGS. 13 and 14 are enlarged cross-sectional views for explaining exemplary embodiments of attaching a membrane member relative to an aperture in an upper container, according to the invention.
Figure 14:
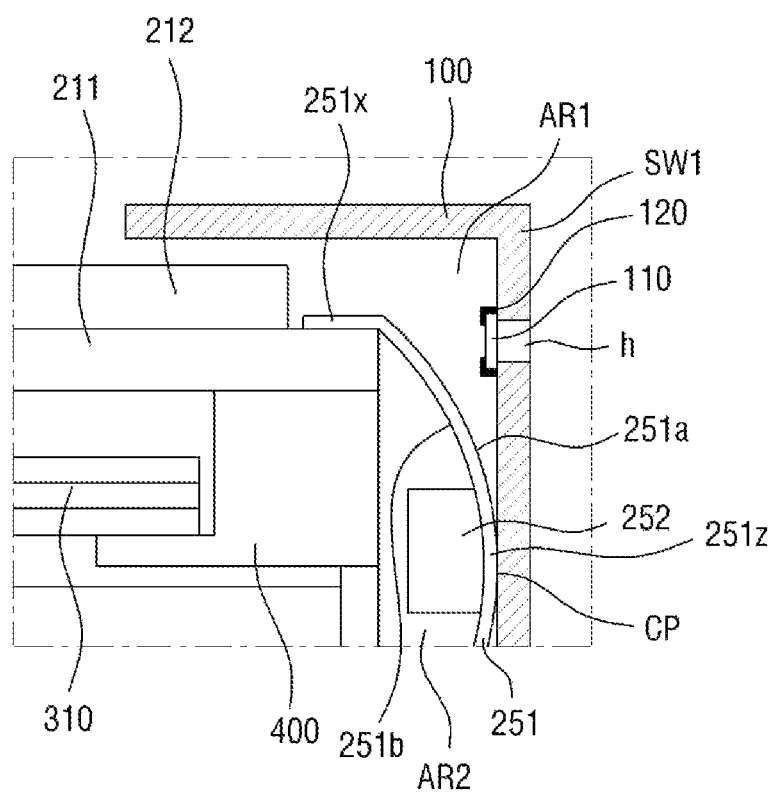

FIGS. 13 and 14 are enlarged cross-sectional views for explaining exemplary embodiments of attaching a membrane member within a display device.

A membrane member 110 having no adhesiveness may be attached on a first side wall SW1 of an upper container 100 by using an adhesive member 120.

The adhesive member 120 may be disposed in a non-overlapping region of the membrane member 110 at which the membrane member 110 does not overlap with an aperture h.

Referring to FIG. 13, the adhesive member 120 may be interposed between the membrane member 110 and the upper container 100 and may couple the membrane member 110 and the upper container 100 to each other.

Alternatively, referring to FIG. 14, the adhesive member 120 may be provided on the edges on the outer side of the membrane member 110 and may couple the upper container 100 and the membrane member 110 to each other, covering a portion of the membrane member 110. The outer side of the membrane member 110 refers to the side of the membrane member 110 that is opposite to the inner side of the membrane member 110 where the membrane member 110 and the upper container 100 are placed in contact with each other.

In a case where the adhesive member 120 is used, the membrane member 110 does not need to be adhesive and may thus be formed using various materials.

The location of the adhesive member 120 is not particularly limited as long as the adhesive member 120 does not cover the entire membrane member 110. Specifically, in most cases, the adhesive member 120 does not cover the entire membrane member 110, but in a case where the adhesive member 120, like the membrane member 110, is formed of a material capable of allowing liquids and gases to pass therethrough while blocking flows of solids, the adhesive member 120 may be allowed to cover the membrane member 110.

Figure 15:
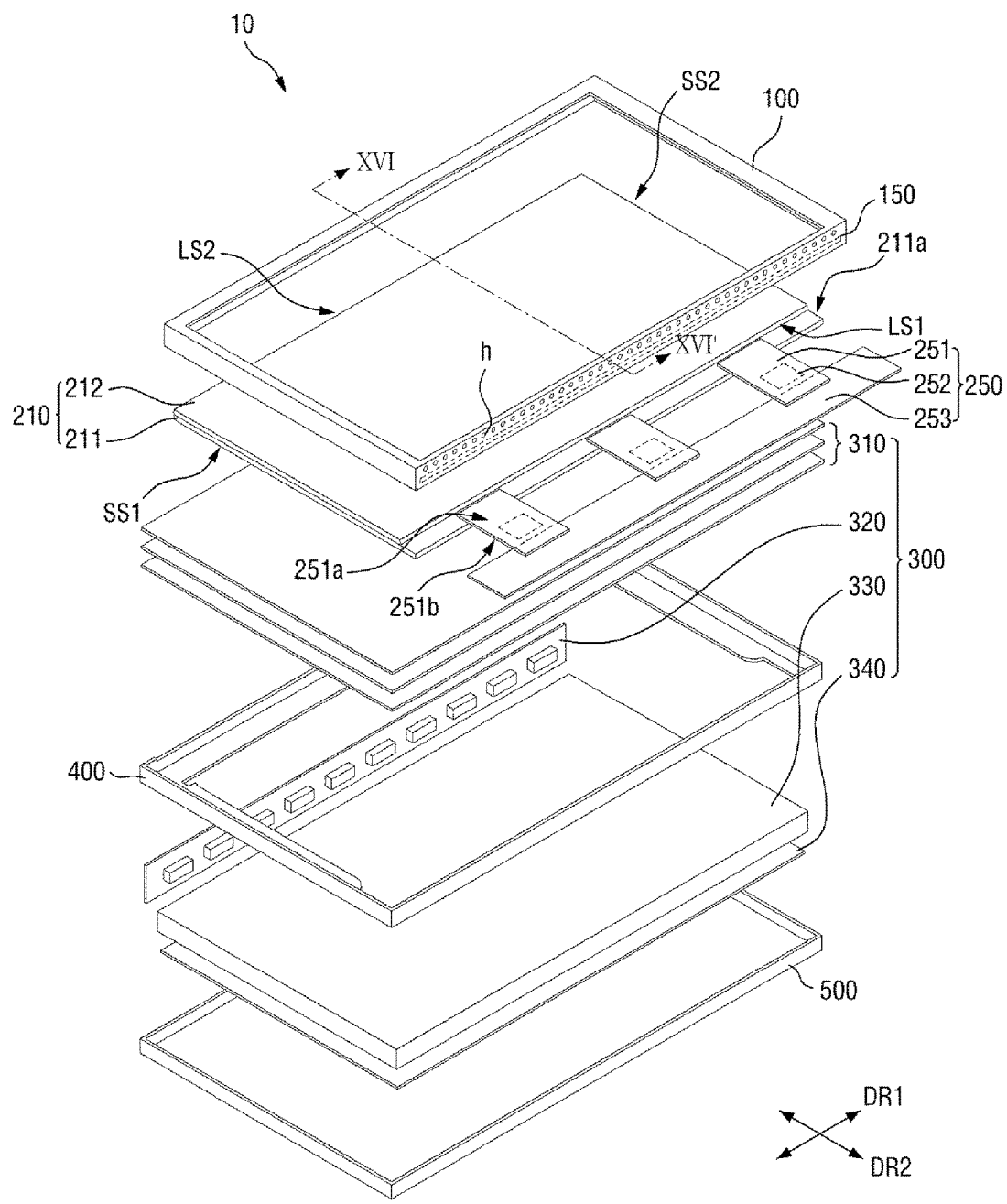
FIG. 15 is an exploded perspective view of another exemplary embodiment of a display device according to the invention, having an aperture and a protruding portion in an upper container.

FIG. 15 is an exploded perspective view of another exemplary embodiment of a display device according to the invention, having an aperture and a protruding portion in an upper container.

Figure 16:
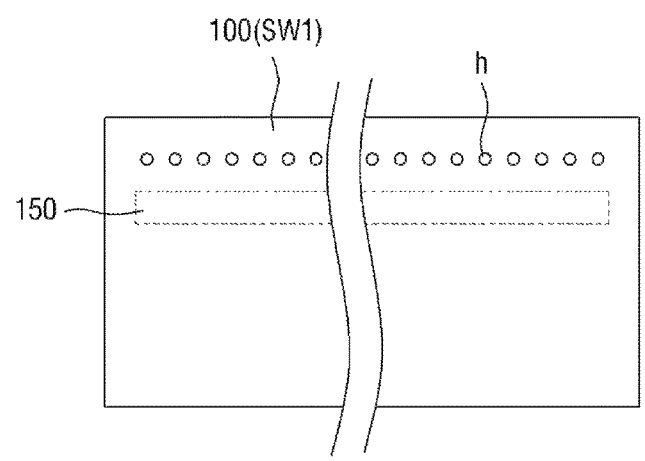
FIG. 16 is an enlarged side view of the display device of FIG. 15.

FIG. 16 is an enlarged side view of the display device of FIG. 15.

Figure 17:
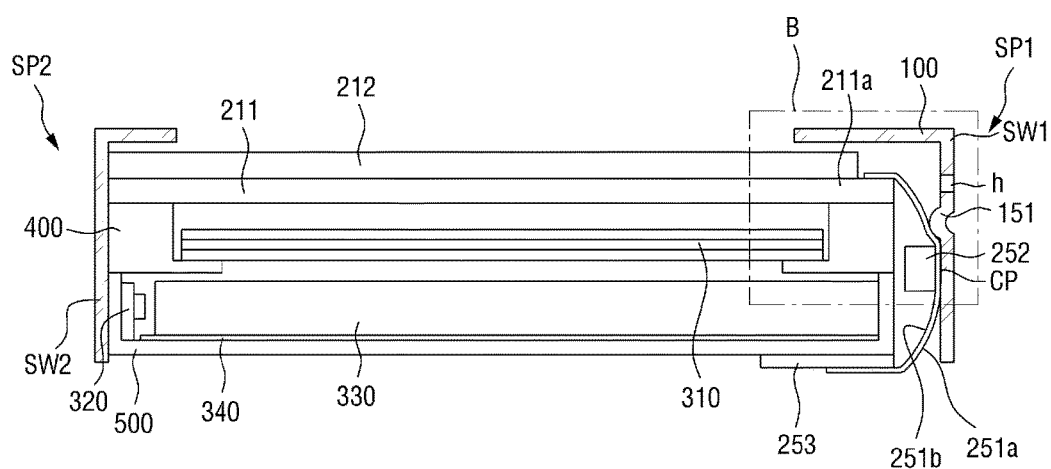
FIG. 17 is a cross-sectional view taken along line XVI-XVI' of FIG. 15.

FIG. 17 is a cross-sectional view taken along line XVI-XVI' of FIG. 15.

Figure 18:
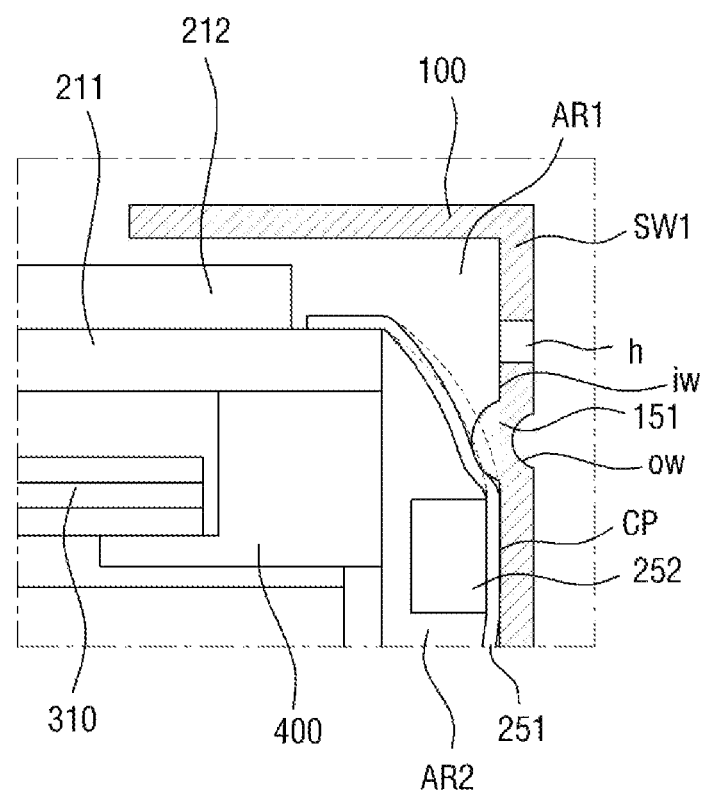
FIG. 18 is an enlarged cross-sectional view of an area B of FIG. 17.

FIG. 18 is an enlarged cross-sectional view of an area B of FIG. 17.

Referring to FIGS. 15 and 16, an upper container 100 may further include a protruding portion 150.

The protruding portion 150 may be disposed or formed along one side wall of the upper container 100. That is, the protruding portion 150 may be disposed or formed on a side wall of the upper container 100 where apertures h are disposed formed, but the present disclosure is not limited thereto. That is, the protruding portion 150 may be additionally disposed or formed on other side walls of the upper container 100, as necessary. FIG. 15 illustrates an example in which the protruding portion 150 is formed on a first side wall SW1 of the upper container 100 along with the apertures h.

The protruding portion 150 may be formed to have a convex surface protruding from the inner side of a first side wall SW1 of the upper container 100 toward a display panel 210. Portions of the upper container 100 define both the apertures h and the protruding portion 150.

The protruding portion 150 may be formed in a rectangular shape, in a plan view, lengthwise extending in one direction. As illustrated in FIG. 16, ends of the protruding portion 150 may be substantially aligned with two the outermost apertures h respectively at opposing ends of an array of apertures h formed along a first direction DR1. The protruding portion 150 will hereinafter be described with reference to FIGS. 17 and 18.

The protruding portion 150 may include an embossed shape 151. The embossed shape 151 refers to a shape obtained by the first side wall SW1 of the upper container 100 being bent to have a curved shape. Specifically, the inner side (indicated with "iw" in FIG. 18) and the outer side (indicated with "ow" in FIG. 18) of the first side wall SW1 of the upper container 100 may be bent together at the same location along the third direction. That is, a thickness of the first side wall SW1 is uniform, even at the embossed shape 151, such that the outer side "ow" of the first side wall SW1 at the protruding portion 150 is not coplanar with a remainder of the outer side "ow" of the first side wall SW1.

A furthest point (e.g., a distal end) of the embossed shape 151 of the protruding portion 150 is a predetermined distance apart from the mold frame 400. The distal end of the protruding portion 150 may be a minimum distance between the first side wall SW1 and the mold frame 400. Flexible circuit boards 251 are disposed in the space between the embossed shape 151 and the mold frame 400.

Along the third direction (e.g., a thickness direction of the display device 10, vertical in FIGS. 16 to 18), the embossed shape 151 may be located between the apertures h and contact portions CP. That is, along the third direction, the locations where the embossed shape 151 begins and ends may be placed between the apertures h and the contact portions CP, and more particularly, spaced apart therefrom along the third direction.

The first surfaces 251a of portions of third sections 251z of the flexible circuit boards 251 may be placed in contact with the most protruding part (e.g., distal end) of the embossed shape 151 and the third sections 251z may be bent to conform to the curvature of the embossed shape 151. The flexible circuit boards 251, which are bent to conform to the curvature of the embossed shape 151, are also placed in contact with the contact portions CP, which are on the inner side of the first side wall SW1 of the upper container 100. FIG. 18 shows a dotted line position of the flexible circuit board 251 which is not bent to conform to the curvature of the embossed shape 151, while the solid line position of the flexible circuit board 251 conforms to the curvature of the embossed shape 151.

The stress between the flexible circuit boards 251 and the embossed shape 151 may be stronger than the stress between the flexible circuit boards 251 and the first side wall SW1 of the upper container 100 at the contact portions CP. That is, with the stronger the stress between the flexible circuit boards 251 and the embossed shape 151, the more firmly the flexible circuit boards 251 are attached to the embossed shape 151. The more firmly the flexible circuit boards 251 are attached to the embossed shape 151, the first and second regions AR1 and AR2 remain more securely physically separated from each other.

The embossed shape 151 may interfere with the flow of an external material infiltrated into the space between the display panel 210 and the cover surface of the upper container 100. In an exemplary embodiment, for example, in a case where a first side SP1 faces downwardly (e.g., gravity direction) and a second side SP2 faces upwardly (e.g., opposite to gravity direction), an external material such as water infiltrated into the space between the display panel 210 and the cover surface of the upper container 100 may flow into the space between the cover surface of the upper container 100 and the embossed shape 151. The flow of the water flowing toward a lower container 500 along the first side wall SW1 of the upper container 100 may be limited by the embossed shape 151. Such limited flow may urge the water toward the apertures h to be released to the outside of the display device 10 through the apertures h. Accordingly, damage to the driving chips 252 from the water can be reduced or effectively prevented.

Figure 19:
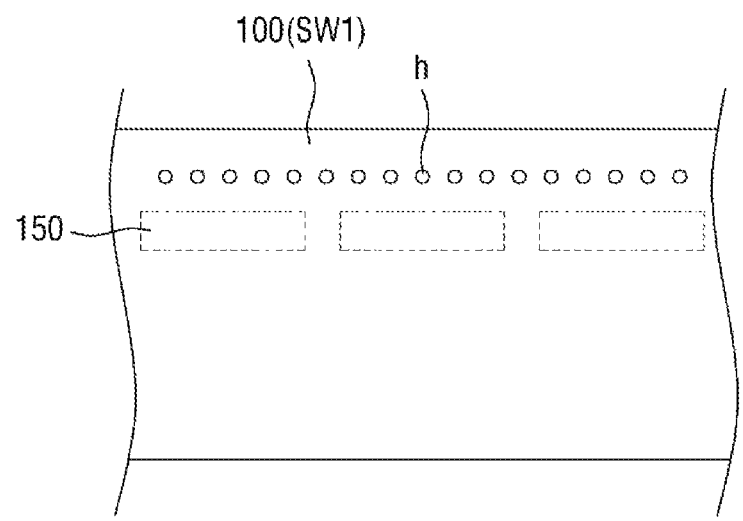
FIGS. 19 through 21 are enlarged side views of modified exemplary embodiments of display devices according to the invention, having various types of protruding portions.
Figure 20:
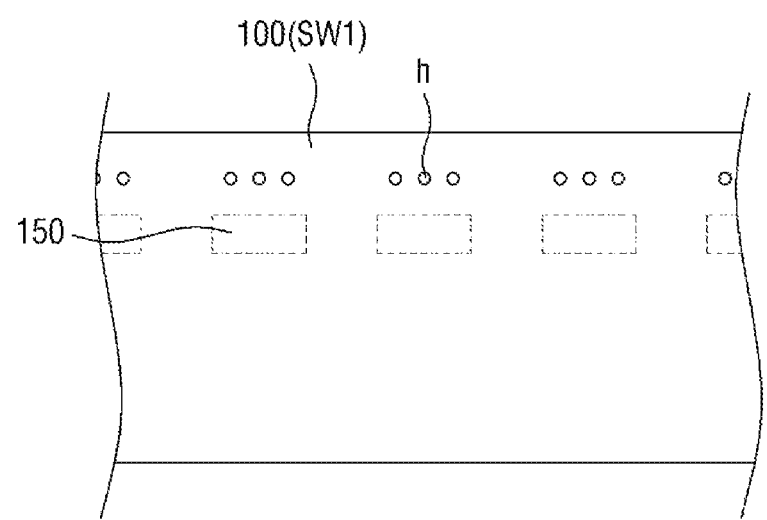
Figure 21:
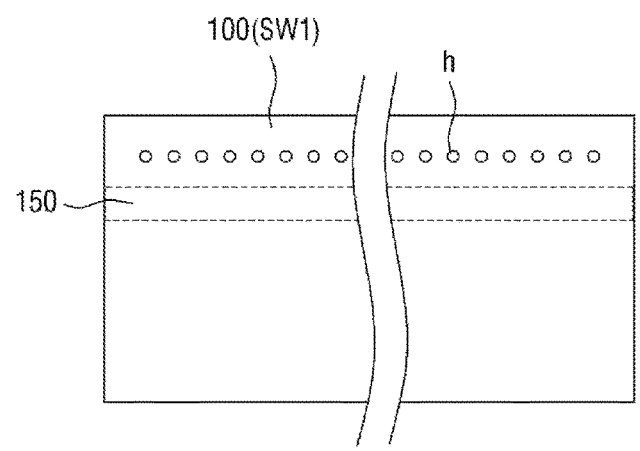

FIGS. 19 through 21 are enlarged side views of modified exemplary embodiments of display devices according to the invention, having various types of protruding portions.

FIG. 16 illustrates an example in which a single protruding portion 150 is formed in a discrete rectangular shape in a plan view, but the present disclosure is not limited thereto. That is, alternatively, referring to FIGS. 19 and 20, the discrete-shaped protruding portion 150 may be provided in plurality along a length direction of a first side wall SW1 of an upper container 100, so as to be spaced apart from each other. Outermost edges of the outermost protruding portions 150 along the length direction of a first side wall SW1 may be substantially aligned with two the outermost apertures h respectively at opposing ends of an array of apertures h formed along a first direction DR1.

In FIG. 19, the plurality of protruding portions 150 may correspond to a single array of the apertures. Particularly, FIG. 20 illustrates an example in which a plurality of protruding portions 150 are disposed or formed to respectively correspond with a plurality of groups of apertures h, respectively, that are formed at regular intervals spaced apart from each other. Spaces between adjacent protruding portions 150 and adjacent groups of apertures h may correspond to each other.

FIG. 21 illustrates an example in which a protruding portion 150 is disposed or formed to extend beyond both ends of an array of apertures h. That is, outermost edges of the protruding portion 150 or a plurality thereof, along the length direction of a first side wall SW1, may be substantially not aligned with two the outermost apertures h respectively at opposing ends of a plurality of apertures h formed along a first direction DR1.

The shape and the arrangement of one or more of the protruding portion 150, however, are not particularly limited, and various modifications can be made thereto without departing from the scope of the present disclosure, depending on the size of a display device 10 and the size of the space between a display panel 210 and the upper container 100.

Figure 22:
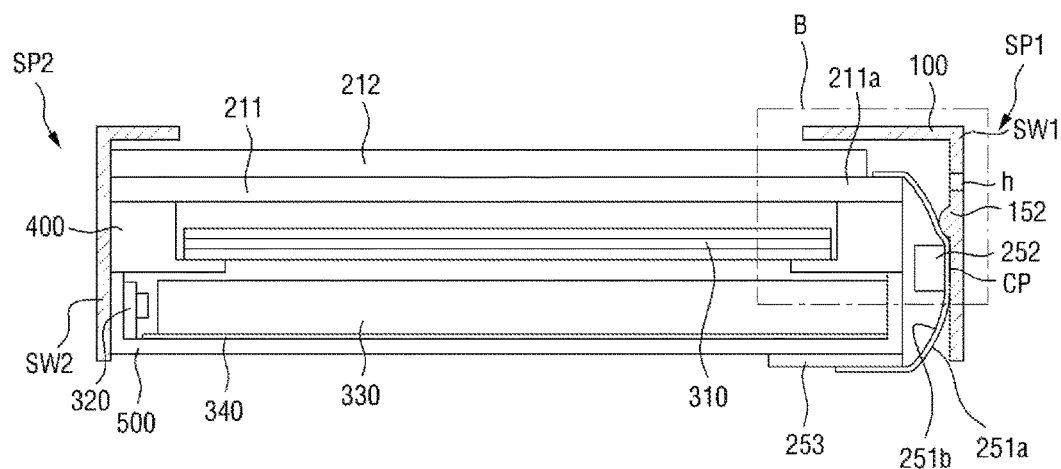
FIG. 22 is a cross-sectional view of another modified exemplary embodiment of a display device according to the invention, having an aperture and a protruding portion in an upper container.

FIG. 22 is a cross-sectional view of another modified exemplary embodiment of a display device according to the invention, having an aperture and a protruding portion in an upper container.

Figure 23:
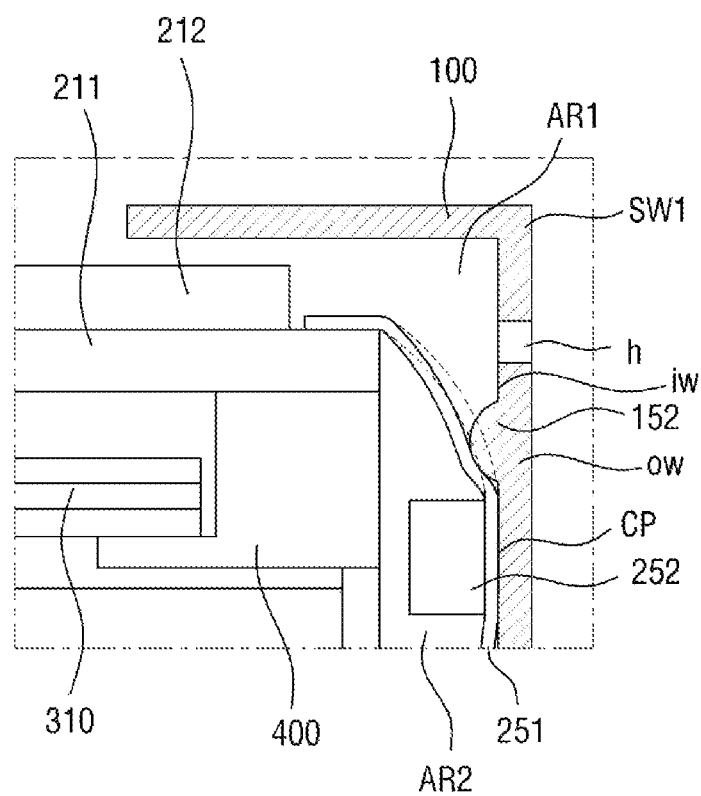
FIG. 23 is an enlarged cross-sectional view of an area C of FIG. 22.

FIG. 23 is an enlarged cross-sectional view of an area C of FIG. 22.

Referring to FIGS. 22 and 23, a protruding portion 150 includes a dam 152. FIG. 23 shows a dotted line position of the flexible circuit board 251 which is not bent to conform to the curvature of the dam 152, while the solid line position of the flexible circuit board 251 conforms to the curvature of the dam 152.

The dam 152 is formed by an upper container 100 being protruded to have a curved shape on the inner side "iw" thereof, while having an outer side "ow" at the dam 152 which is coplanar with the outer side "ow" at a remaining portion of the first side wall SW1. In a cross-sectional view, the outer side "ow" of the upper container 100 may be straight (e.g., coplanar) along an entirety thereof in the third direction, from the cover surface to the lower (distal) end of the first side wall SW1, and the inner side "iw" of the upper container 100 may be curved at the dam 152 toward a display panel 210.

The dam 152 may include or be formed of the same material as, or a similar material to, the upper container 100. In an embodiment, portions of the upper container 100 define the dam 152, not being limited thereto.

FIGS. 22 and 23 illustrate an example in which the dam 152 is hemispherical in a cross-sectional view, but the shape of the dam 152 is not particularly limited. That is, the dam 152 may be formed in various other cross-sectional shapes.

The dam 152 is not limited by the width, the thickness or the material of the upper container 100. In an exemplary embodiment, for example, even in a case where the upper container 100 is relatively weak in strength and thus cannot be bent without compromising the strength thereof, the dam 152 can still be formed, and the relatively weak strength of the upper container 100 can be improved due to the presence of the dam 152.

Figure 24:
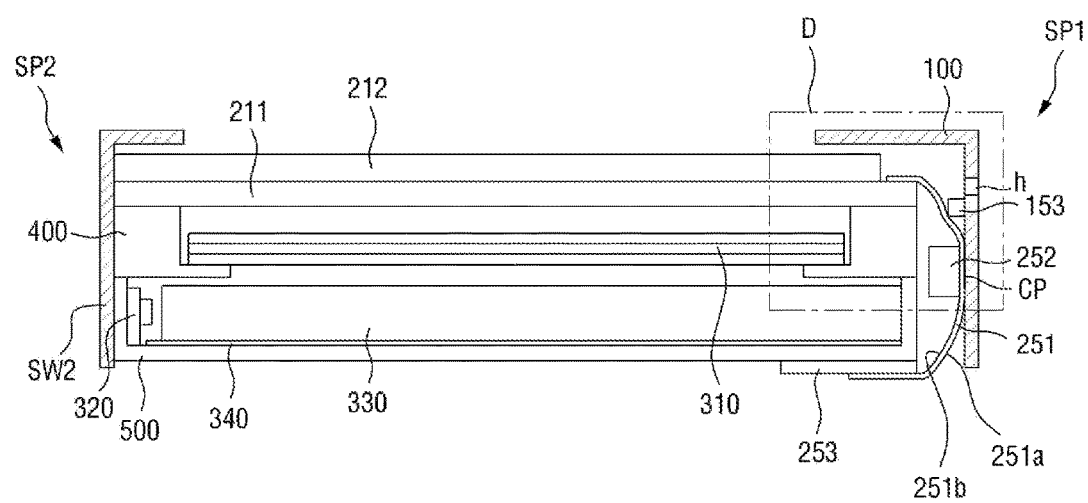
FIG. 24 is a cross-sectional view of a still another exemplary embodiment of a display device according to the invention, having an aperture and a reinforcing member in an upper container.

FIG. 24 is a cross-sectional view of still another exemplary embodiment of a display device according to the invention, having an aperture and a reinforcing member in an upper container.

Figure 25:
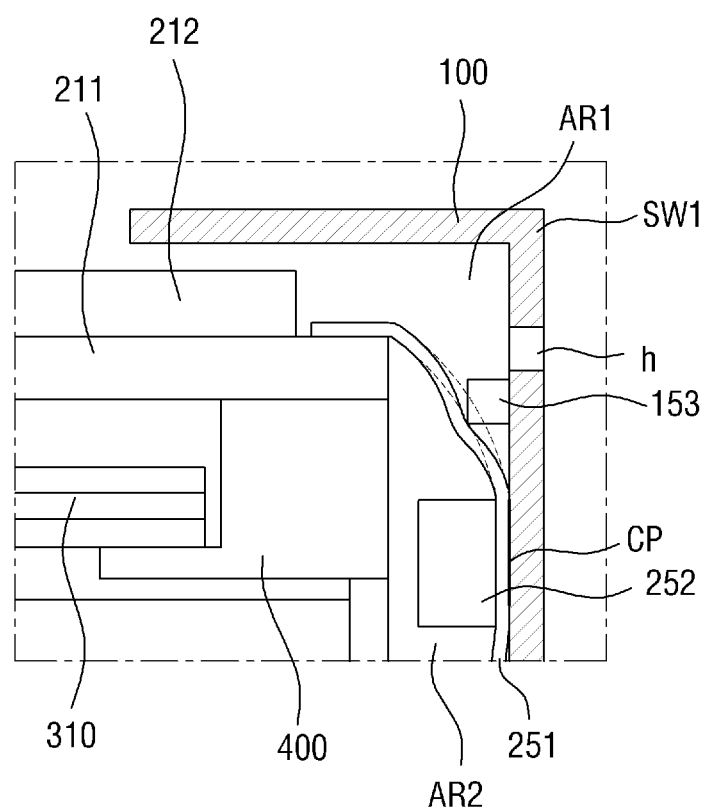
FIGS. 25 and 26 are enlarged cross-sectional views of modified exemplary embodiments of an area D of FIG. 24, for showing various types of reinforcing members.
Figure 26:
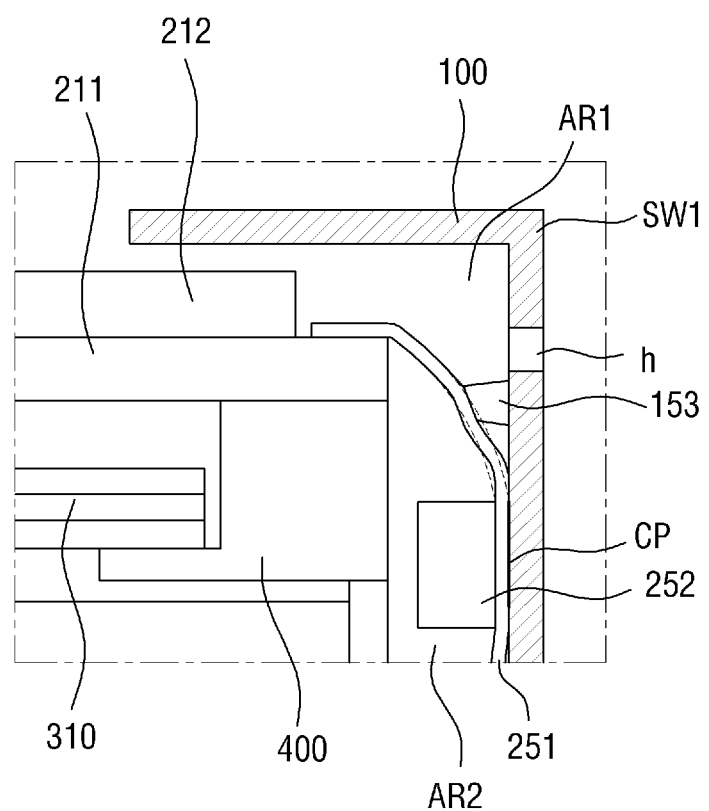

FIGS. 25 and 26 are enlarged cross-sectional views of an area D of FIG. 24, for showing various types of reinforcing members.

Referring to FIGS. 24 through 26, a protruding portion 150 includes a reinforcing member 153.

The reinforcing member 153 may be attached on the inner side of an upper container 100. That is, the reinforcing member 153 may be fabricated separately from the upper container 100 and may be attached later to the upper container 100.

The reinforcing member 153, unlike the dam 152, may be formed of a different material from the upper container 100.

FIG. 25 illustrates an example in which the reinforcing member 153 has a rectangular shape with four right angles in a cross-sectional view, and FIG. 26 illustrates an example in which the reinforcing member 153 has a trapezoidal shape in a cross-sectional view. However, the shape of the reinforcing member 153 is not particularly limited. That is, the reinforcing member 153 may be formed in various other shapes.

In FIG. 25, the distal end surface of the reinforcing member 153 is parallel to the third direction (e.g., vertical in FIG. 25), while FIG. 26 shows the distal end surface of the reinforcing member 153 being inclined. FIG. 25 shows a dotted line position of the flexible circuit board 251 which is not bent due to the profile of the reinforcing member 153 having the rectangular shape, while the solid line shows a position of the flexible circuit board 251 bent due to the profile of the reinforcing member 153. FIG. 26 shows a dotted line position of the flexible circuit board 251 which is bent the reinforcing member 153 having the rectangular shape, while the solid line shows a position of the flexible circuit board 251 bent due to the profile of the reinforcing member 153 having the trapezoidal shape. The contact area of the flexible circuit board 251 with the reinforcing member 153 may be larger in FIG. 26 than in FIG. 25.

Since the reinforcing member 153 can be fabricated separately from the upper container 100, the reinforcing member 153 can be formed in various shapes with ease by using a variety of relatively cheap light-weight materials. As a result, the manufacturing cost of the reinforcing member 153 can be lowered.

As discussed above, one or more embodiment of a display device 10 can control the flow of a fluid by using apertures h, and a flexible circuit board position-fixing member such as the protruding portion 150 and/or the reinforcing member 153.

While exemplary embodiments are described above, it is not intended that these embodiments describe all possible forms of the inventive concept of the present disclosure. Rather, the words used in the specification are words of description rather than limitation, and it is understood that various changes may be made without departing from the spirit and scope of the inventive concept of the present disclosure. Additionally, the features of various implementing embodiments may be combined to form further exemplary embodiments of the present disclosure.

What is claimed is:

1. A display device, comprising:
a display panel which displays an image;
an upper container in which the display panel is disposed, including:
  a cover portion which covers top edges of the display panel,
  a side wall which extends from the cover portion to cover a side of the display panel; and
  an aperture defined in the side wall of the upper container, the aperture exposing the display panel to outside the display device at the side wall of the upper container; and
a driving circuit unit which is attached to the display panel at the side thereof and extends from the display panel to be disposed along an inner side of the side wall of the upper container,
wherein at the side of the display panel at which the driving circuit unit is attached to the display panel,
  the driving circuit unit extended along the inner side of the side wall contacts a first surface of the driving circuit unit with the inner side of the side wall of the upper container to define a contact portion thereof, and
  the aperture is defined in the side wall of the upper container at a location between the contact portion and the cover portion of the upper container.

2. The display device of claim 1, wherein the display panel includes a first substrate and a second substrate which is opposite to the first substrate, the first substrate extending further than the second substrate at the side of the display panel.

3. The display device of claim 2, wherein
the driving circuit unit is attached to the first substrate at the side of the display panel at which the first substrate extends further than the second substrate,
wherein the side wall in which the aperture is defined is disposed at the side of the display panel at which the driving circuit unit is attached to the first substrate.

4. The display device of claim 1, wherein
the driving circuit unit includes a driving chip mounted on a second surface of the driving circuit unit opposite to the first surface thereof, the driving chip mounted at the contact portion.

5. The display device of claim 1, wherein an upper surface of the display panel is spaced apart from the cover portion of the upper container to define a gap between the display panel and the cover portion of the upper container.

6. The display device of claim 5, wherein the gap and the aperture defined in the side wall of the upper container are spatially connected to each other by a space within the display device.

7. The display device of claim 1, further comprising:
a membrane member attached to the side wall in which the aperture is defined, the membrane member covering the aperture.

8. The display device of claim 7, wherein the membrane member has a rectangular shape extended along the side wall in which the aperture is defined.

9. The display device of claim 7, wherein
the aperture is provided in plurality in the side wall of the upper container, and
the membrane member is provided in plurality attached to the side wall in which the apertures are defined, the plurality of membrane members corresponding with the plurality of apertures.

10. The display device of claim 7, further comprising:
an adhesive member between the membrane member and the side wall in which the aperture is defined, to attach the membrane member to the side wall,
wherein the adhesive member does not overlap with the aperture.

11. The display device of claim 7, further comprising:
an adhesive member which attaches the membrane member to the side wall in which the aperture is defined, the adhesive member contacting one surface of the membrane member and sides thereof to contact the side wall in which the aperture is defined,
wherein the adhesive member does not overlap with the aperture.

12. A display device, comprising:
a display panel which displays an image;
an upper container in which the display panel is disposed, including:
  a cover portion which covers top edges of the display panel,
  a side wall which extends from the cover portion to cover a side of the display panel;
  an aperture defined in the side wall of the upper container; and
    a protruding portion which protrudes from an inner side of the side wall in which the aperture is defined,
  wherein the protruding portion protrudes from an inner side surface of the side wall in which the apertures are defined towards the display panel, and
  wherein the protruding portion is defined by a bent portion of the side wall in which the apertures are defined.

13. The display device of claim 12, wherein the protruding portion includes a reinforcing member, which is coupled to the inner side surface of the side wall in which the aperture is defined.

14. The display device of claim 12, wherein
the display panel comprises:
  a driving circuit unit extended along the inner side surface of the side wall in which the aperture is defined to contact a first surface of the driving circuit unit with:
    the inner side surface of the side wall at a contact portion thereof, and
    the protruding portion protruded from the inner side surface of the side wall.

15. The display device of claim 14, wherein the aperture is defined in the side wall of the upper container at a location between the cover portion of the upper container and the protruding portion in contact with the first surface of the driving circuit unit.

16. The display device of claim 12, further comprising:
a membrane member attached to the side wall in which the aperture is defined, the membrane member covering the aperture.

17. A display device, comprising:
a display panel which displays an image;
an upper container in which the display panel is disposed, including:
  a cover portion which covers top edges of the display panel, and
  a side wall which extends from the cover portion to cover a side of the display panel;
a space formed between the display panel and the side wall of the upper container;
an aperture defined in the side wall of the upper container, the aperture exposing the space to outside the display device at the side wall of the upper container;
a gap formed between an upper surface of the display panel and the cover portion which covers top edges of the display panel, the gap exposing the space to outside the display device at the cover portion; and
a driving circuit unit attached to the display panel at a side thereof corresponding to the side wall in which the aperture defined,
wherein
the driving circuit unit attached to the display panel extends from the display panel to be disposed along an inner side of the side wall of the upper container, the driving circuit unit extended along the inner side of the side wall contacting the inner side of the side wall of the upper container to define a contact portion thereof,
the aperture is defined in the side wall of the upper container at a location between the contact portion and the cover portion of the upper container,
the space formed between the display panel and the inner side of the side wall of the upper container is divided by the driving circuit unit, into:
  a first region formed between the driving circuit unit, and each of the cover portion and the side wall of the upper container, and
  a second region formed between the driving circuit unit and the display panel,
the gap and the first region of the space are spatially connected directly to each other to expose the first region to outside the display device at the cover portion, and
the first region of the space and the aperture are spatially connected directly to each other to expose the first region to outside the display device at the side wall of the upper container.

* * * * *